US011042660B2

(12) United States Patent
Zhang et al.

(10) Patent No.: US 11,042,660 B2
(45) Date of Patent: Jun. 22, 2021

(54) DATA MANAGEMENT FOR MULTI-TENANCY

(71) Applicant: International Business Machines Corporation, Armonk, NY (US)

(72) Inventors: Ke Zhang, Beijing (CN); Li Niu, BeiJing (CN); Zhe Yan, Beijing (CN); Lei He, Beijing (CN); Hua Fu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 281 days.

(21) Appl. No.: 16/156,268

(22) Filed: Oct. 10, 2018

(65) Prior Publication Data

US 2020/0117815 A1 Apr. 16, 2020

(51) Int. Cl.
  *G06F 16/00* (2019.01)
  *G06F 21/62* (2013.01)
  *G06F 16/22* (2019.01)

(52) U.S. Cl.
  CPC ...... *G06F 21/6218* (2013.01); *G06F 16/2272* (2019.01)

(58) Field of Classification Search
  None
  See application file for complete search history.

(56) References Cited

U.S. PATENT DOCUMENTS

| 8,966,440 | B2 | 2/2015 | No |
| 9,405,593 | B2 | 8/2016 | McGrath |
| 10,122,747 | B2 * | 11/2018 | Mahaffey ............... H04L 43/10 |
| 10,277,491 | B2 * | 4/2019 | Pugh ..................... H04L 67/306 |
| 2008/0071728 | A1 * | 3/2008 | Lim ....................... G06Q 10/10 |
| 2010/0306179 | A1 * | 12/2010 | Lim ..................... G06F 21/6218 |
| | | | 707/688 |
| 2014/0280492 | A1 | 9/2014 | Yang |
| 2016/0255466 | A1 * | 9/2016 | Shuster ................ H04W 56/00 |
| | | | 455/414.3 |
| 2016/0378436 | A1 | 12/2016 | Jensen |
| 2017/0372271 | A1 * | 12/2017 | Goldsmith ............. H04L 67/22 |
| 2018/0027006 | A1 * | 1/2018 | Zimmermann .......... G06F 9/46 |
| | | | 726/11 |
| 2019/0005113 | A1 * | 1/2019 | Kenedy ............... G06F 16/2237 |

(Continued)

OTHER PUBLICATIONS

"36. Rowkey Design", Apache HBase™ Reference Guide, Version 3.0.0-Snapshot, Last updated Jul. 31, 2018, 10 pages, <https://hbase.apache.org/book.html#rowkey.design>.

(Continued)

*Primary Examiner* — Jean M Corrielus
(74) *Attorney, Agent, or Firm* — Richard B. Thomas

(57) ABSTRACT

In one implementation, a first access behavior is determined. The first access behavior is for accessing a first dataset associated with a first tenant of a storage system, and the first dataset is stored in a first data node in the storage system. A second access behavior is determined. The second access behavior is for accessing a data entry that is to be added into a second dataset associated with a second tenant of the storage system, and the second dataset is stored in at least one data node in the storage system. In response to a deviation between the first access behavior and second access behavior being above a predefined threshold, the data entry is stored into the first data node.

20 Claims, 5 Drawing Sheets

(56) References Cited

U.S. PATENT DOCUMENTS

2019/0138642 A1* 5/2019 Pal .................... G06F 16/27
2019/0258635 A1* 8/2019 Pal .................... G06F 16/2272

OTHER PUBLICATIONS

"6.9. Secondary Indexes and Alternate Query Paths", The Apache HBase™ Reference Guide, Revision 0.94.27, Dec. 16, 2015, <http://hbase.apache.org/0.94/book.html#secondary.indexes>.

"Multi-Tenant SAAS Database Tenancy Patterns", Azure SQL Database | Microsoft Docs, Nov. 12, 2017, 14 pages, <https://docs.microsoft.com/en-us/azure/sql-database/saas-tenancy-app-design-patterns>.

Deshpande, Kuldeep, "Performance Tuning for HBase—Part 1—Rowkey is the Crux", Published on Jul. 19, 2015, 3 pages, <https://www.linkedin.com/pulse/performance-tuning-hbase-part-1-rowkey-crux-kuldeep-deshpande/>.

Mell et al., "The NIST Definition of Cloud Computing", National Institute of Standards and Technology, Special Publication 800-145, Sep. 2011, 7 pages.

Preuveneers, et al., "SAMURAI: A Streaming Multi-tenant Context-Management Architecture for Intelligent and Scalable Internet of Things Applications", IEEE 2014 International Conference on Intelligent Environments (IE), 2014, pp. 226-233.

* cited by examiner

600 ⇘

| ACCESS BEHAVIOR ─ 610 |||
|---|---|---|
| ACCESS TIME | ACCESS FREQUENCY | ACCESS DATA AMOUNT |
| ─ 612 | ─ 614 | ─ 616 |

| TENANT | ACCESS BEHAVIOR | DATA NODE |
|---|---|---|
| T1 | DAYTIME (BEIJING TIME) | N1 |
| T2 | DAYTIME (NEW YORK TIME) | N1 |

| TENANT | ACCESS BEHAVIOR | DATA NODE |
|---|---|---|
| T1 | DAYTIME (BEIJING TIME) | N1 |
| T3 | DAYTIME (SHANGHAI TIME) | N2 |
| T4 | DAYTIME (WASHINGTON TIME) | N2 |

| DATA ENTRY | ORIGINAL ROW KEY | MODIFIED_ROW KEY |
|---|---|---|
| E1_T1 | MODEL1_T1 | N1_MODEL1_T1 — 910 |
| E2_T1 | MODEL2_T1 | N1_MODEL2_T1 |
| E1_T2 | MODEL1_T2 | N2_MODEL1_T2 — 920 |
| E2_T2 | MODEL2_T2 | N2_MODEL2_T2 |

912 DATA NODE

922 DATA NODE

FIG. 9

DATA MANAGEMENT FOR MULTI-TENANCY

BACKGROUND

The Internet of Things (IoT) is getting more popular in various application environments. In general, a great amount of data may be generated by IoT devices and storage systems dedicated to IoT data management have been developed. Usually, these storage systems may serve multiple tenants and store data associated with these tenants in a distributed way.

SUMMARY

In one aspect, a computer-implemented method is disclosed. According to the method, a first access behavior is determined. Here the first access behavior is for accessing a first dataset associated with a first tenant of a storage system, and the first dataset is stored in a first data node in the storage system. Then, a second access behavior is determined, here the second access behavior is for accessing a data entry that is to be added into a second dataset associated with a second tenant of the storage system, and the second dataset is stored in at least one data node in the storage system. Next, in response to a difference between the first access behavior and second access behavior being above a predefined threshold, the data entry is stored into the first data node.

In another aspect, a computing system is disclosed. The computing system comprises a computer processor coupled to a computer-readable memory unit, where the memory unit comprises instructions that when executed by the computer processor implements a method. According to the method, a first access behavior is determined. The first access behavior is for accessing a first dataset associated with a first tenant of a storage system, and the first dataset is stored in a first data node in the storage system. Then, a second access behavior is determined. The second access behavior is for accessing a data entry that is to be added into a second dataset associated with a second tenant of the storage system, and the second dataset is stored in at least one data node in the storage system. Next, in response to a deviation between the first access behavior and second access behavior being above a predefined threshold, the data entry is stored into the first data node.

In another aspect, a computer program product is disclosed. The computer program product comprises a computer readable storage medium having program instructions embodied therewith. The program instructions is executable by an electronic device to cause the electronic device to perform actions of: determining a first access behavior for accessing a first dataset associated with a first tenant of a storage system, the first dataset being stored in a first data node in the storage system; determining a second access behavior for accessing a data entry that is to be added into a second dataset associated with a second tenant of the storage system, the second dataset being stored in at least one data node in the storage system; and in response to a difference between the first access behavior and second access behavior being above a predefined threshold, storing the data entry into the first data node.

It is to be understood that the summary is not intended to identify key or essential features of implementations of the present invention, nor is it intended to be used to limit the scope of the present invention. Other features of the present invention will become easily comprehensible through the description below.

BRIEF DESCRIPTION OF THE DRAWINGS

Understanding that the drawings depict only illustrative embodiments and are not therefore to be considered limiting in scope, the illustrative embodiments will be described with additional specificity and detail through the use of the accompanying drawings, in which:

FIG. 6 depicts an example diagram for various aspects of the access behavior according to an embodiment of the present invention;

FIG. 7 depicts an example block diagram for determining a destination for storing a data entry according to an embodiment of the present invention;

FIG. 8 depicts an example block diagram for determining a destination for storing a data entry according to an embodiment of the present invention; and FIG. 9 depicts an example diagram for modifying a row key of a data entry according to an embodiment of the present invention.

Throughout the drawings, same or similar reference numerals represent the same or similar elements.

DETAILED DESCRIPTION

Figure 1:
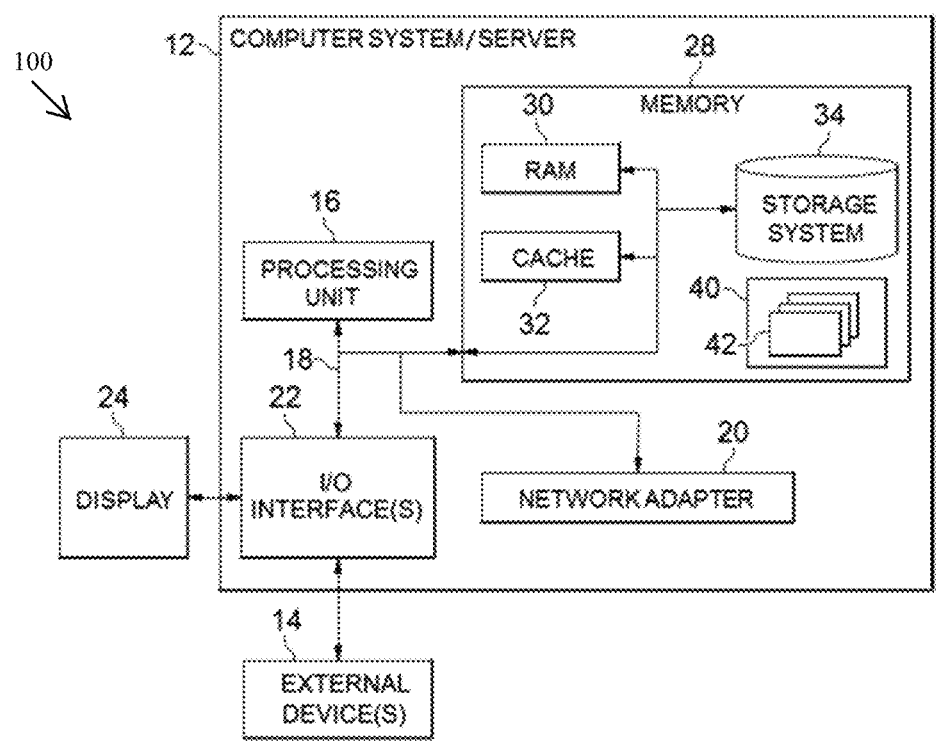
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node 100 is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100, there is a computer system/server 12 or a portable electronic device such as a communication device, which is operational with numerous other general purpose or special purpose computing system environments or configurations. Examples of well-known computing systems, environments, and/or configurations that may be suitable for implementing computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 100 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/ non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
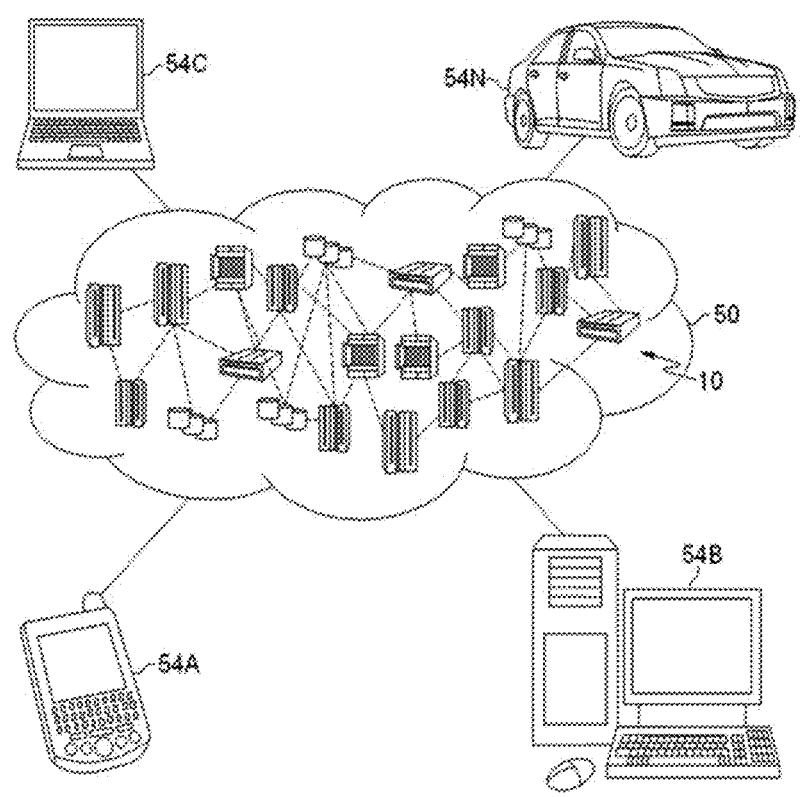
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system MN may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
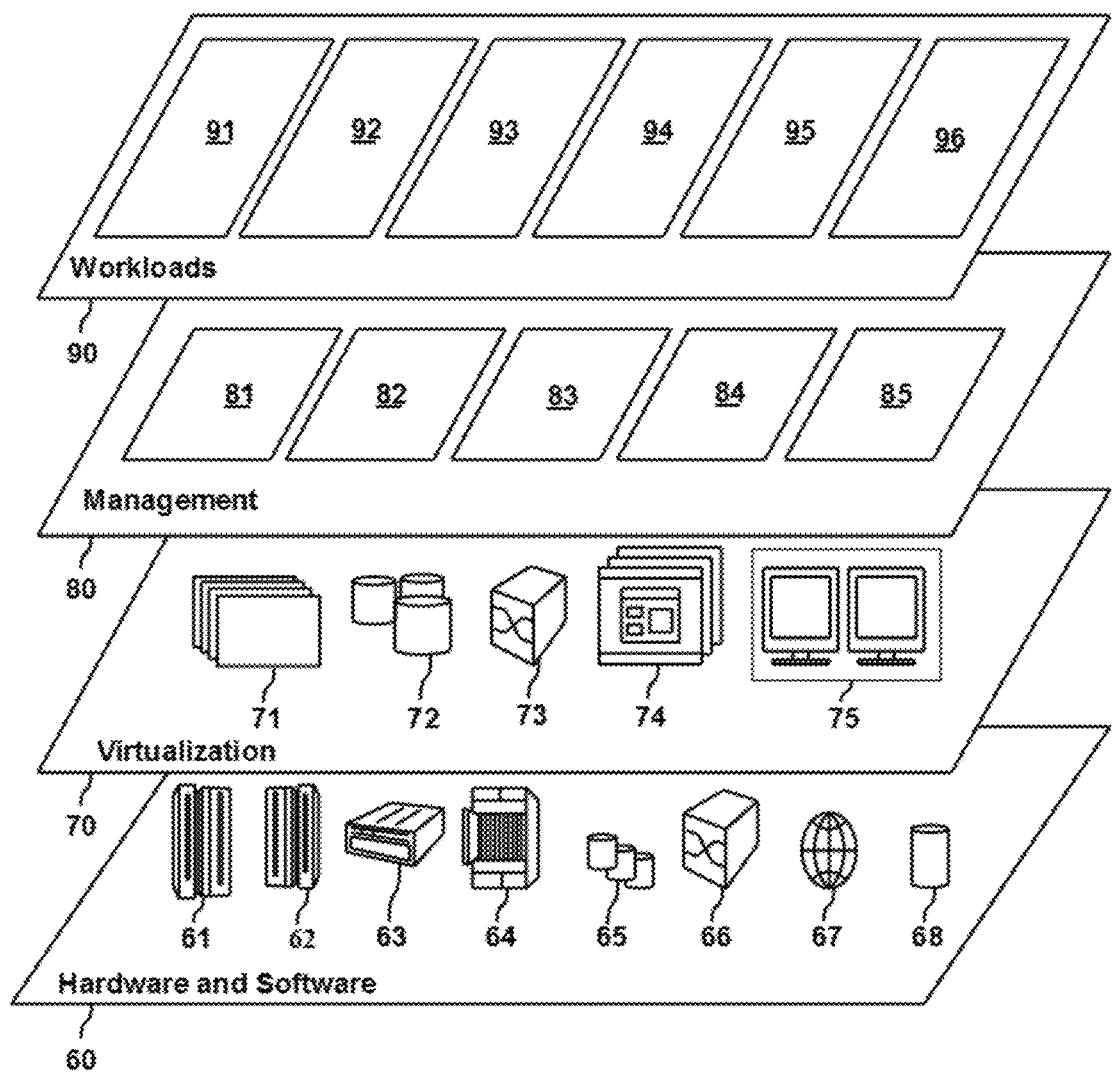
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data management processing 96. Hereinafter, reference will be made to FIGS. 4 to 9 to describe details of the data management processing 96.

An IoT environment may involve a variety of application scenarios. In one scenario, for a factory, multiple sensors may be deployed at different locations on a production line of the factory to monitor states such as temperature, humidity, pressure, and the like in real time. In another scenario, for a city traffic network, cameras may be deployed at important locations along roads in the city to monitor traffic conditions. Here, the above application scenarios may be related to different tenants of a storage system. For example, in the storage system, one tenant may be the factory, and another tenant may be the city traffic center. In this example, data for these tenants may be stored in the same storage system. How to distribute data for multiple tenants in a more convenient and efficient way has become a technical challenge.

There have been proposed technical solutions for managing data for different tenants in an IoT environment. In one conventional solution, data nodes in the storage system may be allocated to each tenant in advance, and an index may be built for accelerating performance in accessing data in the allocated data nodes. However, because the data amount and data access behavior vary among tenants, a lot of manual operations are required to meet each tenant's requirement. In another conventional solution, data of different tenants may be stored across data nodes. However, this may lead to a potential drop in data access efficiency and sometimes a data node may be in an overburdened state. Therefore, how to manage data of multiple tenants in a simpler and more efficient manner becomes a technical problem.

Figure 4:
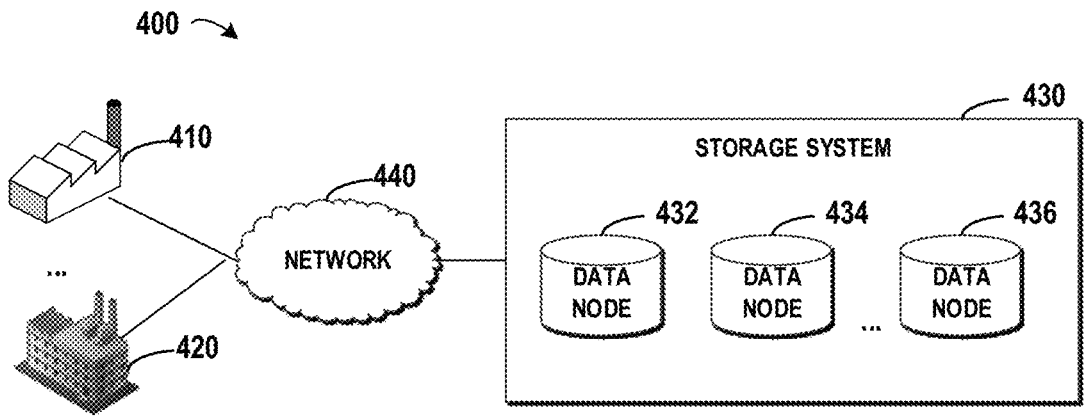
FIG. 4 depicts an example diagram for storing data associated with a tenant according to an embodiment of the present invention.

Embodiments of a system and method discussed herein at least partially solve the above and other potential problems. FIG. 4 depicts an example diagram 400 for storing data associated with a plurality of tenants according to an embodiment. Hereinafter, two factories will be taken as examples for describing how to distribute data associated with multiple tenants. However, it is to be understood that the discussion of factories is provided for purposes of explanation only and is not to be taken in a limiting sense. As shown in FIG. 4, a first tenant 410 and a second tenant 420 access a storage system 430 via a network 440. In this example, the storage system 430 comprises multiple data nodes 432, 434, . . . , and 436. The first tenant 410 may be a factory in Beijing, and the second tenant 420 may be a factory in New York. As the time goes by, data related to the two factories may be collected and added into data nodes in the storage system 430 gradually. In this embodiment, data collected in different days for a factory may be stored into different data nodes, and reference will be made to FIG. 5 for details.

Figure 5:
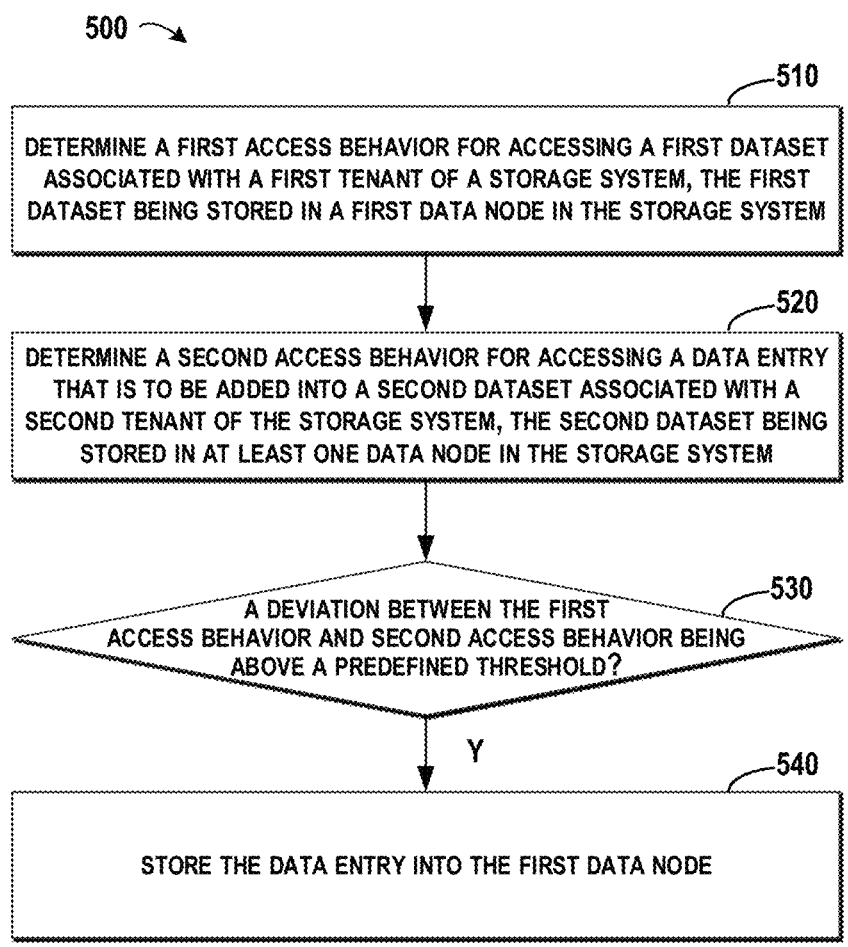
FIG. 5 depicts an example flowchart of a method for storing data associated with a tenant according to an embodiment of the present invention.

FIG. 5 depicts an example flowchart of a method 500 for storing data associated with a tenant according to an embodiment of the present invention. At a block 510, a first access behavior is determined. The first access behavior is related to accessing a first dataset associated with a first tenant (such as the factory in Beijing) of a storage system, and the first dataset is stored in a first data node in the storage system. In this embodiment, the access behavior may relate to multiple aspects in accessing the data, such as, for example, an access time, an access frequency, an amount of data that is accessed, and the like.

At a block 520, a second access behavior is determined. The second access behavior is for accessing a data entry that is to be added into a second dataset associated with a second tenant (such as the factory in New York) of the storage system, and the second dataset is stored in at least one data node in the storage system. In this embodiment, the second dataset includes data that is collected for previous days and stored in data node(s) in the storage system 430, and the data entry that is to be added into the second dataset may refer to the incoming data that will be collected in the future. As more data entries are added into the second dataset, the amount of the second dataset grows.

At a block 530, a deviation or difference between the first access behavior and second access behavior is determined. If the deviation is above a predefined threshold, the method 500 proceeds to a block 540, where the data entry may be stored into the first data node. It is to be understood that a broad explanation may be given for the term "above," it may include meanings of "greater than" or "equal to." Here, the first dataset may be data collected for the factory in Beijing, and the second dataset may be data collected for the factory in New York. Usually, the data is frequently accessed during the daytime, when the access behavior is based on the access time, both of the first access behavior and second access behavior may be described as "daytime." However, Beijing and New York are located in different time zones and there is a 13-hour time difference between the two cities. Therefore, the data entry may be stored into the same first data node because the access time for the first dataset and the data entry to be added into the second dataset may shift in time. In other words, data for the first tenant and second tenant are accessed during their own daytime and may not cause a conflict in the access time.

According to some embodiments, the first access behavior may be determined based on a first distribution of time points at which the first dataset is accessed. In other words, the access behavior may be measured by a time duration where the dataset is accessed. Reference will be made to FIG. 6 for details.

FIG. 6 depicts an example diagram 600 for various aspects of the access behavior according to an embodiment. In this example, the access behavior 610 may comprise any of the following aspects: an access time 612, an access frequency 614 and an access data amount 616. In one embodiment, when the access behavior 610 is only related to the access time, then the access behavior 610 may be determined based on a distribution of time points at which the dataset is accessed.

In another embodiment, the access frequency 614 is considered. For example, the time duration where the access frequency 614 is above a threshold frequency may be selected for determining the distribution. Meanwhile, the time duration where the access frequency 614 is below the threshold frequency may be omitted. It is to be understood that, in some embodiments, using only the peak access frequency may cause an overload in the data node and, thus, time durations with high access frequency may be selected for determining the distribution. In another embodiment, the access amount 616 is considered. For example, the time duration where the access amount 616 is above a threshold amount may be selected for determining the distribution. Meanwhile, the time duration where the access amount 616 is below the threshold amount may be omitted because only the larger access amount may cause an overload in the data node, in some embodiments. In some such embodiments, time periods in which the dataset was intensively accessed is utilized as grounds for determining the historical behavior. Therefore, the access behavior can be determined in a more precise manner.

According to some embodiments, the historical behavior for accessing at least one data entry in the second dataset is determined, and then the second access behavior is determined based on the historical behavior. In some such embodiments, the second access behavior is determined in an accurate manner because the historical behavior reflects a tendency of the second behavior.

In one embodiment, if the access behavior 610 relates to the access time 612, then the time points at which the dataset was previously accessed is used to determine the access behavior 610. In another embodiment, if the access behavior 610 relates to the access frequency 614, then a threshold frequency is set and a time duration where the access frequency was above the threshold frequency is used to determine the access behavior 610. In another embodiment, if the access behavior 610 relates to the access amount 616, then a threshold amount is set and a time duration where the access amount was above the threshold amount is used to determine the access behavior 610.

According to some embodiments, the deviation between the first access behavior and second access behavior is determined based on a time difference between the first distribution and a second distribution. In some such embodiments, a shift in the workloads of different tenants is considered. Therefore the data entry associated with the first tenant is stored to a same data node where the data associated with the second tenant, whose workload is not overlapped with the first tenant, is stored. In this way, the access to the data associated with the two tenants does not cause a peak in the access workloads.

FIG. 7 depicts an example block diagram 700 for determining a destination for storing a data entry according to an embodiment. In FIG. 7, the first column shows an identifier of the tenant, the second column shows the access behavior of the tenant and the third column shows the data node that may be used for the tenant. Referring to the first entry in FIG. 7, the tenant T1 is a factory in Beijing and the access behavior happens in the daytime (Beijing time). In this example, the data for the tenant T1 is stored in the data node N1. Referring to the second entry in FIG. 7, the tenant T2 is a factory in New York and the access behavior happens in the daytime (New York time).

In the example in FIG. 7, supposing the business hours for both factories are 09:00 to 18:00 at their local time. As the time difference between Beijing and New York is 13 hours, their business hours will not be overlapped and then the data for T2 may be stored in the data node N1. In this example, even if the data for T1 and T2 is stored in the same data node N1, the data for T1 and T2 will not be accessed in the same duration and a conflict in data access can be avoided.

According to some embodiments, if the deviation between the first access behavior and second access behavior is below the predefined threshold, the data entry is stored into another data node that has a shifted workload compared with the workload of the first data node. In such embodiments, as a conflict between accessing the data entry and the second dataset is avoided, system performance for accessing the data entry and the second dataset is maintained at a high level. Reference will be made to FIG. 8 for details.

FIG. 8 depicts an example block diagram 800 for determining a destination for storing a data entry according to an embodiment. Referring to the first entry in FIG. 8, in this example, the tenant T1 is a factory in Beijing, the access behavior happens in the daytime (Beijing time), and the data for the tenant T1 is stored in the data node N1. Referring to the second entry the tenant T3 is a factory in Shanghai and the access behavior happens in the daytime (Shanghai time) in this example. As Beijing and Shanghai are located in a same time zone, the data for both T1 and T3 will typically be accessed during the same time period and, thus, the data for the tenant T2 is not stored in the data node N1 and is stored in another data node N2. Thus, in a more general sense, if the access behavior for the first tenant is sufficiently different than the access behavior for the second tenant (e.g. exceeds a threshold), then the data entry for the second tenant can be stored on the same node as the first tenant. If the access behavior for the first tenant and the access behavior for the second tenant are too similar (e.g. below a threshold), the data entry for the second tenant is stored on a different node from data entries for the first tenant.

If a second data node is used, the second data node is selected based on a deviation between the second access behavior and an access behavior to data in the second data node. The data entry may for the second tenant can be stored into the second data node if the second access behavior is sufficiently different from the access behavior to data in the second data node. In other words, in this example of FIG. 8, the deviation or difference in the access behavior of tenant T1 and the access behavior of tenant T3 is not sufficiently different to store the data for tenant T1 and tenant T3 in the same data node. Thus, a different access node is selected. In particular, the second data node is selected based on the access behavior of the tenant T3 being sufficiently different from the access behavior of another tenant, such as tenant T4, whose data is stored on the second data node. Continuing the example in FIG. 8, the data node N2 in which the data for a tenant T4 (a factory in Washington in this example) is selected for storing the data for the tenant T3 because the deviation between the access behaviors for T4 and T3 is high enough to avoid a conflict in accessing the data.

Although the above paragraphs illustrate selecting a data node where there is no overlap between the first access behavior and second access behavior, in some situations, a data node where an overlap occurs can be selected. For example, continuing the example in FIG. 8, a data node N3 (not shown), in which the data for a tenant T5 (a factory in Paris) is stored, can be selected for storing the data for the tenant T3. Although there may be an overlap between the business hours for the two factories, the time difference between the two factories reaches 6 hours and the slight overlap may not result in a heavy workload in the data node N3.

According to some embodiments, the data amount of the entry is considered so as to ensure that the first data node has enough free space. Specifically, an estimation of the data amount of the data entry is determined. In some such embodiments, the estimation is determined based on a growing tendency of the historical records. For example, if the historical records show that the data amounts for each day are always similar, then the estimation may be set to an average data amount for one day. In another example, if the historical records show a growth of 5% compared with a previous day, then the estimation may be set to (1+5%)*data amount of the previous day.

Further, a difference between the estimation of data amount and an amount of free space in the first data node is determined. If the difference is above a threshold amount, it means that the first data node has enough free space and then the data entry can be stored into the first data node. Otherwise, if the difference is below the threshold amount, it means that the first data node may be short of free space and then an appropriate second data node other than the first data node is selected. Here, the second data node is selected based on an access behavior for accessing data in the second data node (e.g. estimation of data amount) and an amount of free space in the second data node. In this way, the data entry is stored in a data node where a conflict in data access may be reduced.

According to some embodiments, once a third tenant joins into the storage system, a third behavior for accessing a third dataset associated with the third tenant is determined. Further, other access behaviors for accessing data in other data nodes in the storage system may be determined, and then a third data node in the storage system for storing the third dataset may be allocated to the third tenant based on the third behavior and other access behaviors. In some such embodiments, the third dataset may be stored into a data node that results in a minimum conflict in data access.

According to some embodiments, the storage system may be an object-based database, and the data entry may be referenced by a row key. Compared with a traditional SQL database, the object-based data may store any type of objects into the database and each of the objected may be identified by a row key. In some such embodiments, the row key is modified based on an identifier of the second data node, such that the destination of the data entry may be added into the row key. Further, an index indicating a mapping between the row key and the modified row key may be recorded for further processing. In some such embodiments, when a request is received for accessing the data entry, the destination of the data entry may be easily obtained from the index, and thus the data entry may be quickly retrieved. Meanwhile, for other applications that access the data entry by the original row key, they are not required to modify their source codes because the original and the modified row keys are mapped to each other based on the index.

In some such embodiments, various ways may be adopted for modifying the original row key. Reference will be made to FIG. 9, which depicts an example diagram for an index based on a mapping between original and modified row keys according to some embodiments. In FIG. 9, the first column indicates identifications of data entries, the second column indicates originals row keys and the third column indicates the modified row keys. In this example, a prefix representing the destination data node is added to the original row key to form the modified row key. Taking the data entry "E1_T1" as an example, the original row key for this data entry is "MODEL1_T1." A prefix "N1_" (indicated by a reference number 910 in FIG. 9) is added at the header of the original row key to form the modified row key "N1_MODEL1_T1." The prefix "N1_" here shows an identification of the data node into which the data entry is to be stored. Similarly, a prefix "N2_" (indicated by a reference number 920 in FIG. 9) is added at the header of the original row key for "E1_T2" to form the modified row key "N2_MODEL1_T2."

As shown in the example of FIG. 9, the data entries "E1_T1" and "E2_T1" are to be stored into the data node 912 (indicated by "N1"), and the data entries "E1_T2" and "E2_T2" are to be stored into the data node 922 (indicated by "N2"). Although the above paragraphs describe examples by modifying the original row key with a prefix, alternatively, a postfix indicating the destination may be added to the original row key. Furthermore, other techniques of modifying the original row key can be used in other embodiments.

According to some embodiments, if a request for accessing a target data entry indicated with a target row key, a row key matching the target row key is retrieved from the index, and then the target data entry is accessed based on the retrieved row key. For example, continuing the example in FIG. 9, if a request is received for accessing a data entry indicated with "MODEL1_T1," then "MODEL1_T1" may be searched in the index to find the modified row key "N1_MODEL1_T1." Next, the request may be directed to the data node 912 and then the data entry labeled with "N1_MODEL1_T1" may be retrieved and returned.

According to some embodiments, the workloads are balanced among the data nodes in the storage system. In some such embodiments, the workloads relate to various aspects of the data nodes, and any of the following aspects may be considered: access behavior for accessing data in the data nodes, the utilization ratio of the data nodes, the performance of the data nodes, the number of tenants for which the data nodes are serving, and the like.

According to some embodiments, rules are predefined for how to distribute dataset associated with a tenant. For example, a rule for tenant A may define that data entries for the tenant A should be stored into as few nodes as possible. In such a situation, once a data node is initially selected for storing the first data entry, it is desired that the subsequent data entries be stored into the same data node before the data node is full. If the access behavior for the tenant A is conflicted with another tenant B, then the incoming data entries for the tenant B are stored into another data node.

According to some embodiments, one or more new data nodes may be added into the storage system. As a new data node is empty at when added, free space in this new data node may be allocated to incoming data entry with relatively greater amount than other nodes.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
   determining a first access behavior for accessing a first dataset associated with a first tenant of a storage system, the first dataset being stored in a first data node in the storage system;
   determining a second access behavior for accessing a data entry that is to be added into a second dataset associated with a second tenant of the storage system, the second dataset being stored in at least one data node in the storage system;
   determining a difference between the first access behavior and the second access behavior based on a time difference, wherein the time difference is at least partially based on temporal separation of the first access behavior and the second access behavior as a function of respective locations within one or more time zones, and the time difference is at least partially representative of an overlap of the first access behavior and the second access behavior; and
   in response to the time difference between the first access behavior and the second access behavior being above a predefined threshold, storing the data entry into the first data node.

2. The computer-implemented method of claim 1, wherein determining the first access behavior comprises:
   determining the first access behavior based on a first distribution of time points at which the first dataset is accessed.

3. The computer-implemented method of claim 2, wherein determining the second access behavior comprises:
   obtaining a historical behavior for accessing at least one data entry in the second dataset; and
   determining the second access behavior based on the historical behavior.

4. The computer-implemented method of claim 3, further comprising:
   determining the difference between the first access behavior and the second access behavior based on a time difference between the first distribution and a second distribution of time points at which the second dataset is accessed.

5. The computer-implemented method of claim 1, further comprising:
   in response to the difference between the first access behavior and the second access behavior being below the predefined threshold, determining an access behavior for accessing data in a second data node;
   selecting the second data node based on a difference between the second access behavior and the determined access behavior for accessing data in the second data node; and storing the data entry into the second data node.

6. The computer-implemented method of claim 1, wherein storing the data entry into the first data node comprises:
   determining an estimation of data amount of the data entry; and
   in response to a difference between the estimation of data amount and an amount of free space in the first data node being above a threshold amount, storing the data entry into the first data node.

7. The computer-implemented method of claim 1, further comprising:
   in response to a third tenant having joined into the storage system, determining a third 1 access behavior for accessing a third dataset associated with the third tenant;
   determining other access behaviors for accessing data in other data nodes in the storage system; and
   allocating a third data node in the storage system for storing the third dataset based on the third access behavior and other access behaviors.

8. The computer-implemented method of claim 1, wherein the storage system is an object-based database, the data entry is referenced by a row key, and the method further comprises:
   modifying the row key based on an identifier of the first data node; and
   building an index indicating a mapping between the row key and the modified row key.

9. The computer-implemented method of claim 8, further comprising:
   in response to a request for accessing a target data entry indicated with a target row key, retrieving from the index a row key matching the target row key; and
   accessing the target data entry based on the retrieved row key.

10. A computing system comprising a computer processor coupled to a computer-readable memory unit, the memory unit comprising instructions that when executed by the computer processor implements a method comprising:
    determining a first access behavior for accessing a first dataset associated with a first tenant of a storage system, the first dataset being stored in a first data node in the storage system;
    determining a second access behavior for accessing a data entry that is to be added into a second dataset associated with a second tenant of the storage system, the second dataset being stored in at least one data node in the storage system;
    determining a difference between the first access behavior and the second access behavior based on a time difference, wherein the time difference is at least partially based on temporal separation of the first access behavior and the second access behavior as a function of respective locations within one or more time zones, and the time difference is at least partially representative of an overlap of the first access behavior and the second access behavior; and
    in response to the time difference between the first access behavior and the second access behavior being above a predefined threshold, storing the data entry into the first data node.

11. The computing system of claim 10, wherein determining the first access behavior comprises:
    determining the first access behavior based on a first distribution of time points at which the first dataset is accessed.

12. The computing system of claim 11, wherein determining the second access behavior comprises:
    obtaining a historical behavior for accessing at least one data entry in the second dataset; and
    determining the second access behavior based on the historical behavior.

13. The computing system of claim 12, wherein the method further comprises:
    determining the deviation between the first access behavior and the second access behavior based on a time difference between the first distribution and a second distribution of time points at which the second dataset is accessed.

14. The computing system of claim 10, wherein the method further comprises:
    in response to the deviation between the first access behavior and the second access behavior being below the predefined threshold,
    determining an access behavior for accessing data in a second data node;
    selecting the second data node based on a deviation between the second access behavior and the determined access behavior for accessing data in the second data node; and
    storing the data entry into the second data node.

15. The computing system of claim 10, wherein storing the data entry into the first data node comprises:
    determining an estimation of data amount of the data entry; and
    in response to a difference between the estimation of data amount and an amount of free space in the first data node being above a threshold amount, storing the data entry into the first data node.

16. The computing system of claim 10, wherein the method further comprises:
    in response to a third tenant having joined into the storage system, determining a third access behavior for accessing a third dataset associated with the third tenant;
    determining other access behaviors for accessing data in other data nodes in the storage system; and
    allocating a third data node in the storage system for storing the third dataset based on the third access behavior and other access behaviors.

17. The computing system of claim 10, wherein the storage system is an object-based database, the data entry is referenced by a row key, and the method further comprises:
    modifying the row key based on an identifier of the first data node; and
    building an index indicating a mapping between the row key and the modified row key.

18. The computing system of claim 17, wherein the method further comprises:
    in response to a request for accessing a target data entry indicated with a target row key, retrieving from the index a row key matching the target row key; and
    accessing the target data entry based on the retrieved row key.

19. A computer program product, the computer program product comprising a computer readable storage medium having program instructions embodied therewith, the program instructions executable by an electronic device to cause the electronic device to perform actions of:
    determining a first access behavior for accessing a first dataset associated with a first tenant of a storage system, the first dataset being stored in a first data node in the storage system;

determining a second access behavior for accessing a data entry that is to be added into a second dataset associated with a second tenant of the storage system, the second dataset being stored in at least one data node in the storage system;

determining a difference between the first access behavior and the second access behavior based on a time difference, wherein the time difference is at least partially based on temporal separation of the first access behavior and the second access behavior as a function of respective locations within one or more time zones, and the time difference is at least partially representative of an overlap of the first access behavior and the second access behavior; and in response to the time difference between the first access behavior and the second access behavior being above a predefined threshold, storing the data entry into the first data node.

20. The computer program product of claim 19, wherein determining the second access behavior comprises:

obtaining a historical behavior for accessing at least one data entry in the second dataset; and determining the second access behavior based on the historical behavior.

* * * * *